(12) United States Patent
Giering et al.

(10) Patent No.: US 8,327,981 B2
(45) Date of Patent: Dec. 11, 2012

(54) BALL SCREW FOR A MOTOR VEHICLE BRAKE AND A MOTOR VEHICLE BRAKE

(75) Inventors: Wilfried Giering, Mendig (DE); Benedikt Ohlig, Vallendar (DE)

(73) Assignee: Lucas Automotive GmbH, Koblenz (DE)

( * ) Notice: Subject to any disclaimer, the term of this patent is extended or adjusted under 35 U.S.C. 154(b) by 0 days.

(21) Appl. No.: 13/290,498

(22) Filed: Nov. 7, 2011

(65) Prior Publication Data

US 2012/0111673 A1    May 10, 2012

Related U.S. Application Data

(63) Continuation of application No. 12/680,807, filed as application No. PCT/EP2008/008275 on Sep. 29, 2008, now Pat. No. 8,051,957.

(30) Foreign Application Priority Data

Oct. 1, 2007 (DE) .......................... 10 2007 046 953

(51) Int. Cl.
F16D 65/56  (2006.01)
(52) U.S. Cl. ................... 188/71.9; 188/72.8; 188/162
(58) Field of Classification Search .......... 188/156–164, 188/71.9–72.8
See application file for complete search history.

(56) References Cited

U.S. PATENT DOCUMENTS

| | | | |
|---|---|---|---|
| 4,721,190 A | 1/1988 | Schmidt et al. | |
| 5,829,557 A | 11/1998 | Halasy-Wimmer et al. | |
| 6,158,557 A | 12/2000 | Leitermann et al. | |
| 6,571,921 B2 | 6/2003 | Ohtani et al. | |
| 6,607,059 B1 | 8/2003 | Kapaan et al. | |
| 6,814,190 B1 | 11/2004 | Olschewski et al. | |
| 6,837,342 B1* | 1/2005 | Olschewski et al. ......... | 188/72.8 |
| 6,938,735 B1 | 9/2005 | Hilzinger | |
| 8,051,957 B2* | 11/2011 | Giering et al. ............... | 188/72.8 |
| 2003/0029681 A1* | 2/2003 | Severinsson ................. | 188/72.8 |
| 2003/0042084 A1* | 3/2003 | Kawase et al. ............... | 188/72.1 |
| 2005/0252734 A1* | 11/2005 | Giering ......................... | 188/72.8 |
| 2006/0032712 A1 | 2/2006 | Kollaard et al. | |

FOREIGN PATENT DOCUMENTS

| | | |
|---|---|---|
| DE | 19511287 A1 | 1/1996 |
| DE | 19731626 C1 | 12/1998 |
| DE | 19835550 A1 | 2/2000 |
| DE | 19944876 A1 | 3/2001 |
| DE | 10126556 A1 | 3/2002 |
| DE | 10233938 A1 | 2/2004 |
| JP | 54120366 | 9/1979 |

* cited by examiner

Primary Examiner — Christopher Schwartz
(74) Attorney, Agent, or Firm — MacMillan, Sobanski & Todd, LLC

(57) ABSTRACT

The invention relates to a ball screw for a motor vehicle brake, in particular for an electromechanically actuable motor vehicle brake, comprising a rotatable spindle; a nut that is axially movable relative to the spindle in accordance with the rotation thereof; and rolling body arrangement that is disposed between, and displaceable relative to, the spindle and the nut. In this ball screw it is provided that the rolling body arrangement is preloaded into a predetermined normal position by means of at least one spring element. The invention further relates to a vehicle brake having such a ball screw.

13 Claims, 13 Drawing Sheets

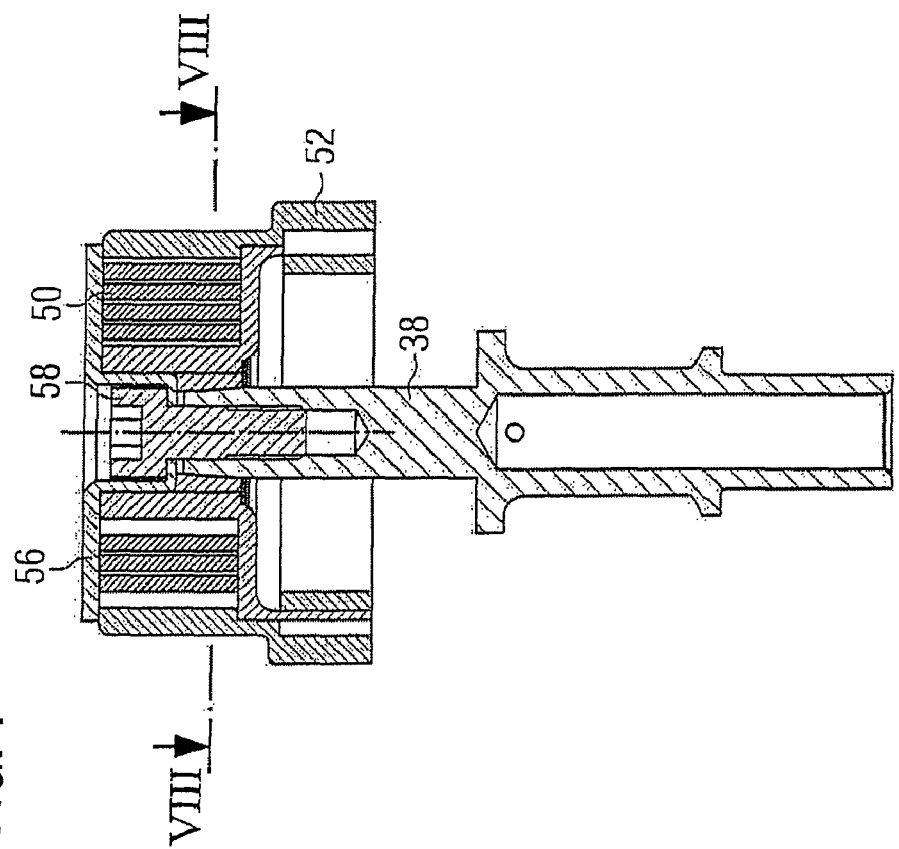
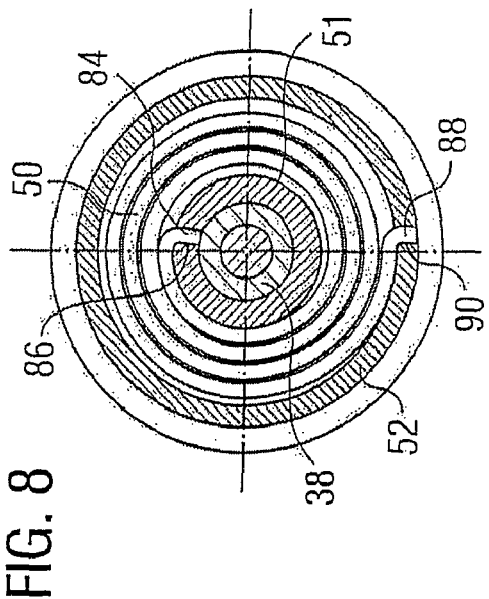
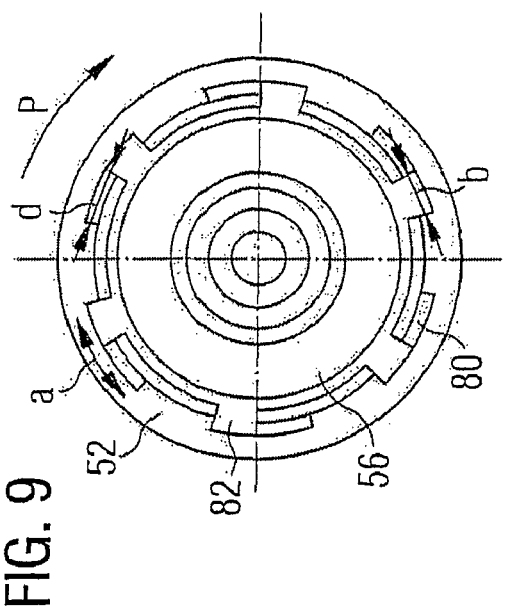

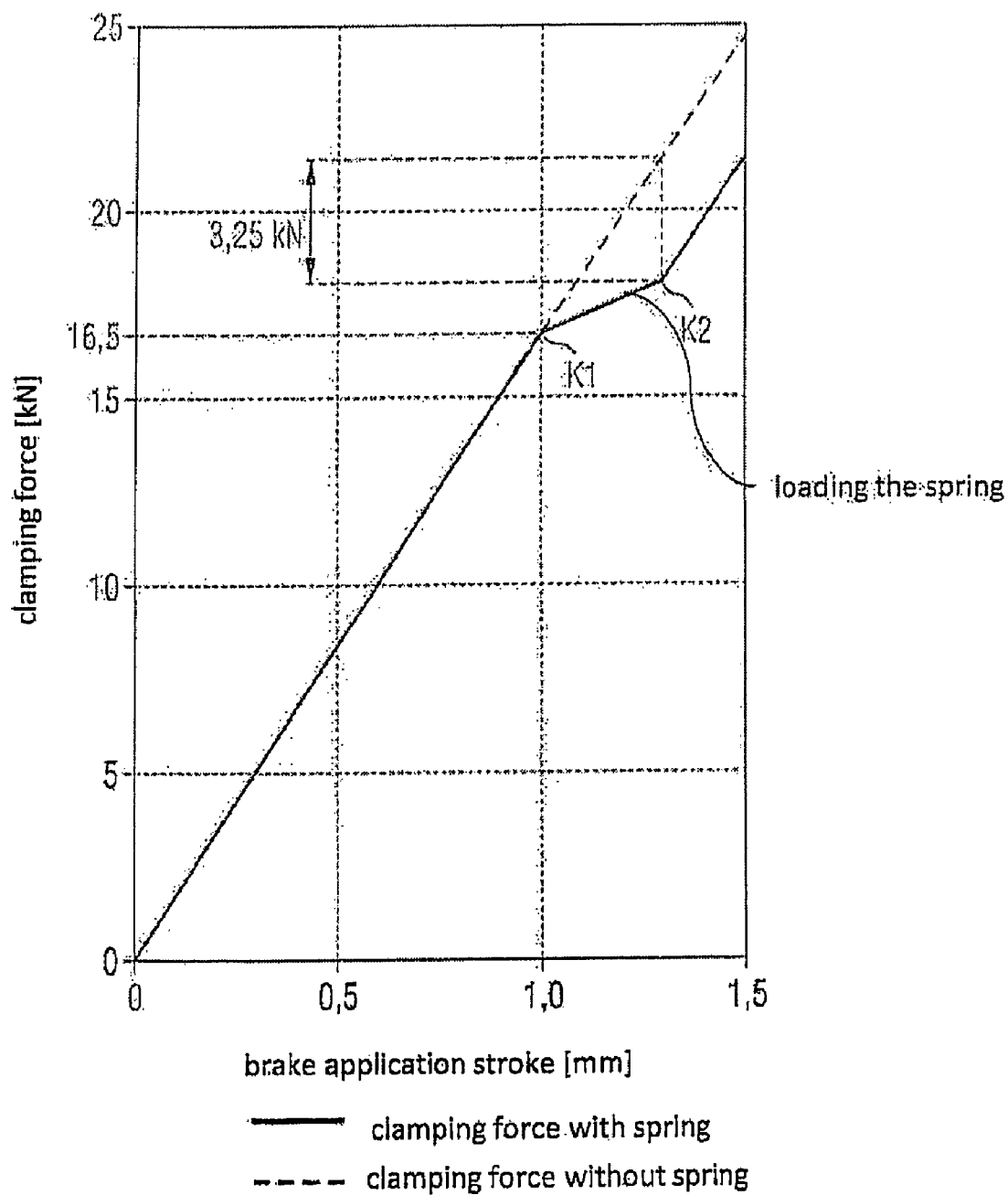

BALL SCREW FOR A MOTOR VEHICLE BRAKE AND A MOTOR VEHICLE BRAKE

BACKGROUND OF THE INVENTION

The present invention relates to a ball screw for a motor vehicle brake, in particular for an electromechanically actuable motor vehicle brake, comprising a rotatable spindle, a nut that is axially movable relative to the spindle in accordance with the rotation thereof, and a rolling body arrangement that is disposed between, and displaceable relative to, the spindle and the nut.

From the background art various types of motor vehicle brakes are known. There are for example conventional motor vehicle brakes, in which brake linings are displaced by means of a hydraulic system so that they act upon a brake disk co-rotating with a wheel and in dependence upon the applied hydraulic pressure achieve a more or less strong braking effect. Besides such hydraulically actuable motor vehicle brakes there are in the background art purely electromechanically actuable motor vehicle brakes, in which the brake linings are displaceable by means of an electromechanical drive, in particular with simultaneous use of an electric motor. Such brakes have the advantage that for their control a complex hydraulic system is not required, it being possible instead to use the vehicle electronic system to control the brake system.

The background art according to DE 101 26 556, and corresponding U.S. Pat. No. 6,571,921B2, both of which are incorporated by reference herein in entirety, discloses such an electromechanically actuable vehicle brake, in which a brake lining that is disposed in a conventional manner in a floating caliper arrangement may be displaced by means of a ball-ramp mechanism in order thereby to achieve a braking effect.

The background art according to DE 195 11 287 further discloses an electromechanically actuable disk brake of the floating caliper type, in which the brake lining that is displaceable relative to the housing is displaceable by means of a spindle-nut arrangement. Disposed between the spindle and the nut are threaded rollers, which act as rolling bodies and together with the spindle and the nut form a roller screw.

As further background art, reference is to be made to the document DE 198 35 550 A1.

BRIEF SUMMARY OF THE INVENTION

A feature of the invention is to provide a ball screw of the initially described type, which, while being of a simple and economical construction, takes up only a little installation space and even in the case of wear of the brake linings returns reliably into a predetermined normal position in the non-actuated state of the brake.

This feature is achieved by a ball screw of the initially described type, wherein it is provided that the rolling body arrangement is preloaded into a predetermined normal position by means of at least one spring element disposed outside of the rolling body arrangement.

The effect achievable by using a ball screw, in which the rolling body arrangement is preloaded into a predetermined normal position by means of at least one spring element, is that during application of the brake the ball screw functions in a conventional manner, wherein by means of the electromechanical drive the clamping force of the spring also has to be additionally overcome. In a known manner, however, the rolling body arrangement upon a rotation of the spindle executes only a relative rotation relative to the spindle and the nut that corresponds to approximately half the extent of the relative rotation between spindle and nut. Accordingly, the extent of the axial movement of the rolling body arrangement relative to the spindle is also considerably smaller than the extent of the axial movement of the nut relative to the spindle. If, for example, the spindle is rotated through 10° in order to achieve a specific axial movement of the nut that achieves a specific braking effect, then the rolling body arrangement is rotated merely through approximately 5° and consequently also moves only a correspondingly smaller distance in axial direction. During this axial displacement of the rolling body arrangement the spring element, starting from its already preloaded state, is loaded further. As soon as the braking operation is terminated and the spindle is rotated back by the electromechanical drive, this movement is assisted by the spring element.

Besides the previously described mode of operation of the brake and, in this connection, of the ball screw according to the invention during a service braking operation, an essential aspect of the invention is to use the brake also to bring about a parking braking state. For this purpose, the brake is likewise actuated electromechanically, as in the previously described situation of a service braking operation. However, upon attainment of a specific clamping force at the brake disk the arrangement is blocked, for example by fixing the spindle by means of a blocking device, so that the clamping force, apart from specific settling losses, is substantially maintained. If the parking braking state is later cancelled, for example by release of the blocking device, then the ball screw owing to the loaded state of the spring element returns automatically into its normal position as soon as the ball screw is in the load-free state. In this way it may be guaranteed that, even with increasing lining wear, the ball screw after termination of a parking braking state constantly occupies a predetermined normal position. It is consequently guaranteed that wear compensation may be carried out by means of a special compensating mechanism provided for this purpose and an impairment of the mode of operation of the ball screw because of unintended wear compensation by means of the ball screw may be prevented.

A development of the invention provides a thrust piece, which interacts with the rolling body arrangement and upon which the spring element acts. This thrust piece simplifies the mechanical design of the invention as it allows the use of a conventional rolling body arrangement, which may be brought into interaction with the thrust piece specially designed for the connection of the spring element. In connection with the mechanical design and implementation of the invention using a thrust piece, it may be provided that the thrust piece is guided displaceably relative to the spindle. In particular, in this connection it may be provided that the thrust piece is of a bush-like construction and is accommodated in a locating opening in the spindle. This results in a compact design of the arrangement that is easy to manufacture.

According to the invention it may further be provided that the spindle is connected in a rotationally fixed manner to a threaded bush having track grooves for the rolling body arrangement. In this way manufacture of the spindle may be simplified because the track grooves, which as such are complicated to manufacture, may be provided in a separate component that is later connected, for example by shrinking on or screwing, to the spindle for joint movement.

In order to keep the movement of the rolling body arrangement relative to the spindle within predetermined limits, a development of the invention provides stop means, which delimit a relative movement of the rolling body arrangement relative to the spindle. In this case, the one stop ensures that the rolling body arrangement constantly returns to the predetermined normal position, caused by the preloading of the spring element. A further stop may define a maximum excursion of the rolling body arrangement relative to the spindle.

A development of the invention provides that the at least one spring element is disposed inside the spindle and is fastened at one end thereto. This development of the invention, particularly in connection with the use of a bush-like thrust piece according to the above description, ensures a particularly compact design of the ball screw according to the invention.

As an alternative to an arrangement of the spring element inside the spindle, for example in a central bore of the spindle, according to the invention it may also be provided that the at least one spring element is disposed outside of the spindle, wherein the spring element is fastened at one end to the rolling body arrangement and acts at the other end upon the threaded bush. As a result, the spindle may be made more compact and the overall construction may be further simplified.

According to the invention the rolling body arrangement may comprise a rolling body chain. It is however also possible for the rolling body arrangement to comprise a bush-like rolling body cage. In this case, with regard to the invention variant, in which the spring element is disposed outside of the spindle, it may be provided the bush-like rolling body cage extends between the spindle and the spring element. In this way, the track grooves of the spindle may be shielded from the spring by the bush-like rolling body cage.

With regard to the spring element it may be provided that this takes the form of a preloaded tension spring, a compression spring or a torsion spring. It is further possible to provide a plurality of spring elements in order to provide a specific spring characteristic.

The invention further relates to a motor vehicle brake, in particular an electromechanically actuable motor vehicle brake comprising a brake lining that is displaceable relative to a housing, a motor drive, and a displacement mechanism disposed between the brake lining and the motor drive, wherein the displacement mechanism comprises a ball screw of the previously described type. In this motor vehicle brake, the spindle of the ball screw is rotatable by means of the motor drive—optionally with the interposition of a gear unit.

Other advantages of this invention will become apparent to those skilled in the art from the following detailed description of the preferred embodiments, when read in light of the accompanying drawings.

BRIEF DESCRIPTION OF THE DRAWINGS

FIG. 7 is a detail view of the spindle plus spiral spring;

FIG. 8 is a sectional view along the section line VIII-VIII of FIG. 7 for pictorialization of the spiral spring;

FIG. 9 is a front view of the spindle in detail, as it also emerges already from the sectional view according to FIG. 2;

FIG. 10 is a graph, in which with regard to the background art and the invention the clamping force is plotted against the brake application stroke;

DETAILED DESCRIPTION OF THE INVENTION

Figure 1:
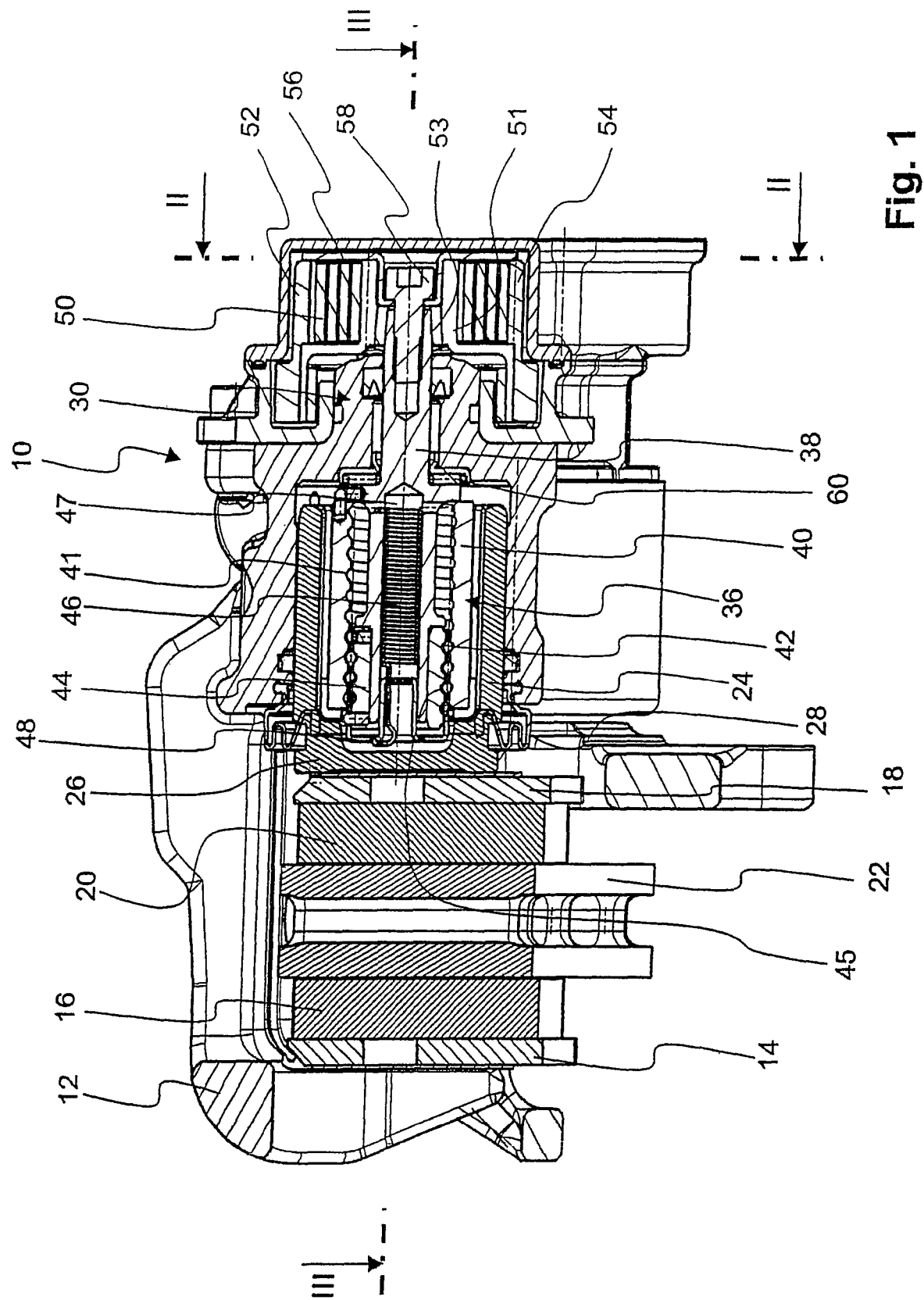
FIG. 1 is a sectional view through a vehicle brake according to the invention.

In FIG. 1 a vehicle brake according to the invention is shown in cross section and generally denoted by 10. It comprises a housing 12, in which a first brake lining carrier 14 having a brake lining 16 is mounted in a stationary manner. In the housing 12 a second brake lining carrier 18 having a brake lining 20 is further provided. This second brake lining carrier 18 is displaceable in the housing 12. Disposed between the brake linings 16 and 20 is a brake disk 22, which is connected in a rotationally fixed manner to a motor vehicle wheel.

For displacement of the brake lining 20 a piston 24 is accommodated displaceably in the housing 12. This piston 24 has on its left end a piston termination 26 that is used to displace the brake lining carrier 18 having the brake lining 20. The piston 24 is sealed off from external influences, such as moisture and dirt, by means of a gaiter arrangement 28.

For displacement of the brake lining 18 by means of the piston 24 an electromechanical drive arrangement 30 is provided. This comprises a motor 32 (see FIG. 3), which via toothed gearing 34, which is described in greater detail below, drives a ball screw 36. The ball screw 36 comprises a spindle 38, which is rotated by the motor. The ball screw 36 further comprises a nut 40, which is disposed around the spindle 38. In the nut 40 track grooves 41 for a rolling body arrangement 42 are provided. The spindle 38 further comprises at one end a threaded bush 44, which is connected in a rotationally fixed manner to the spindle 38 and in turn has radially outer track grooves 45 for the rolling body arrangement 42. The spindle 38 is provided from its in FIG. 1 left end with a central bore 47. Accommodated in this central bore 47 is a tension spring 46, which at its in FIG. 1 right end is held in a rotationally fixed manner in the spindle 38. With its in FIG. 1 left end the tension spring 46 acts upon a thrust piece 48, which in turn is in abutment with the rolling body arrangement 42 and preloads this into the normal position thereof shown in FIG. 1. A detailed description of the ball screw 36 is also additionally provided below with reference to FIGS. 11 to 15.

Further evident from FIG. 1 is a spiral spring 50, which is accommodated under preloading in the space between a stepped transmission element 51 and a locating bush 52. The transmission element 51 has internal gearing 53, by which it is connected by corresponding complementary gearing on the spindle 38 in a pressure-resistant manner to the spindle 38. The locating bush 52 on the other hand is rotatable relative to the spindle 38 and the transmission element 51. The locating bush 52 is provided at its outer periphery with external gearing 54, which is in mesh with an intermediate gearwheel (74, see FIG. 2) for rotating the locating bush 52. The locating bush 52 is closed at its in FIG. 1 right side by a cover 56. The cover 56 is connected by a clamping screw 58 in a rotationally fixed manner to the spindle 38 and the transmission element 51.

Finally, there is further evident from FIG. 1 a thrust bearing 60, which is used to support axial forces.

Figure 2:
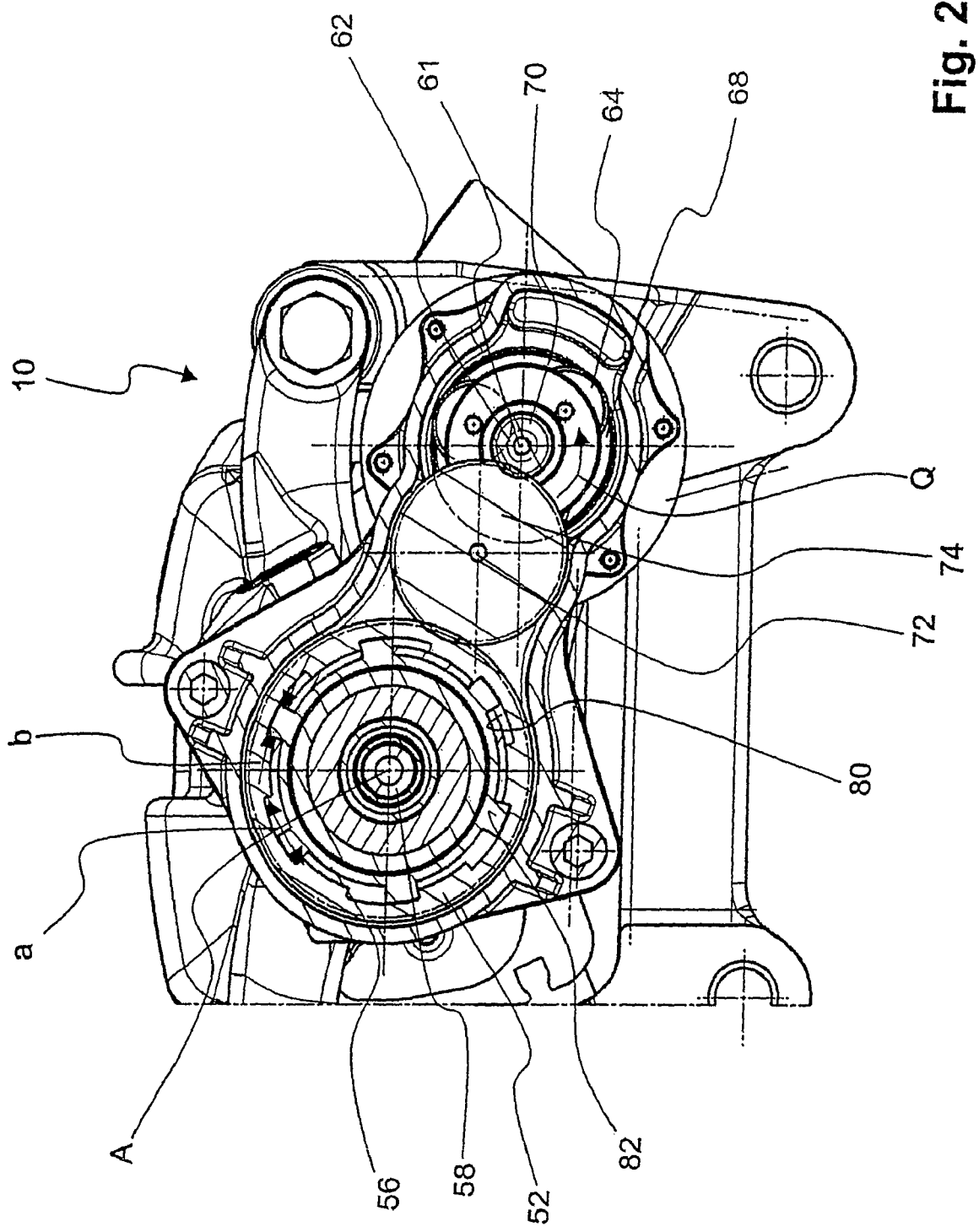
FIG. 2 is a sectional view along the section line II-II of FIG. 1.
Figure 3:
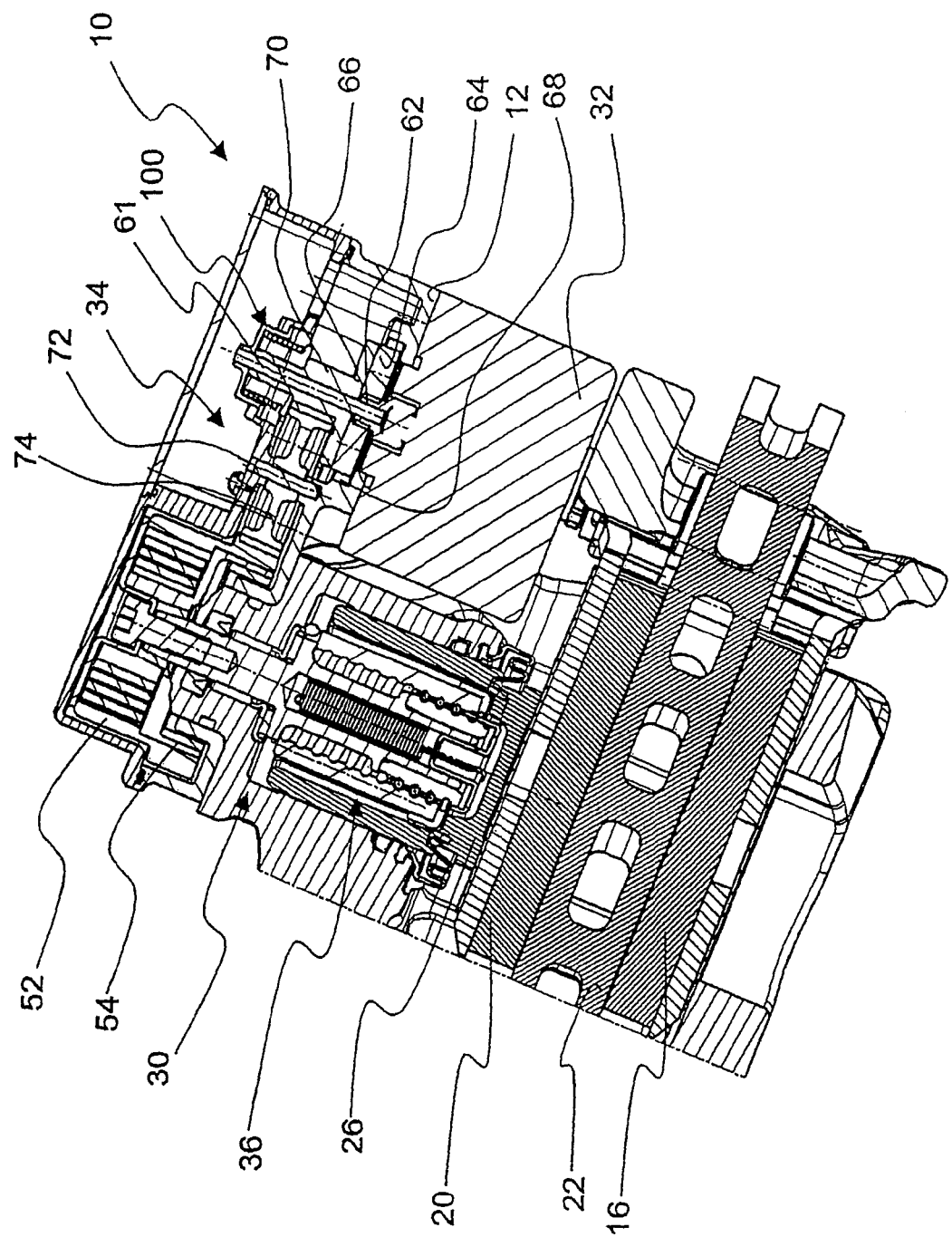
FIG. 3 is a sectional view along the section line III-III of FIG. 1.
Figure 4:
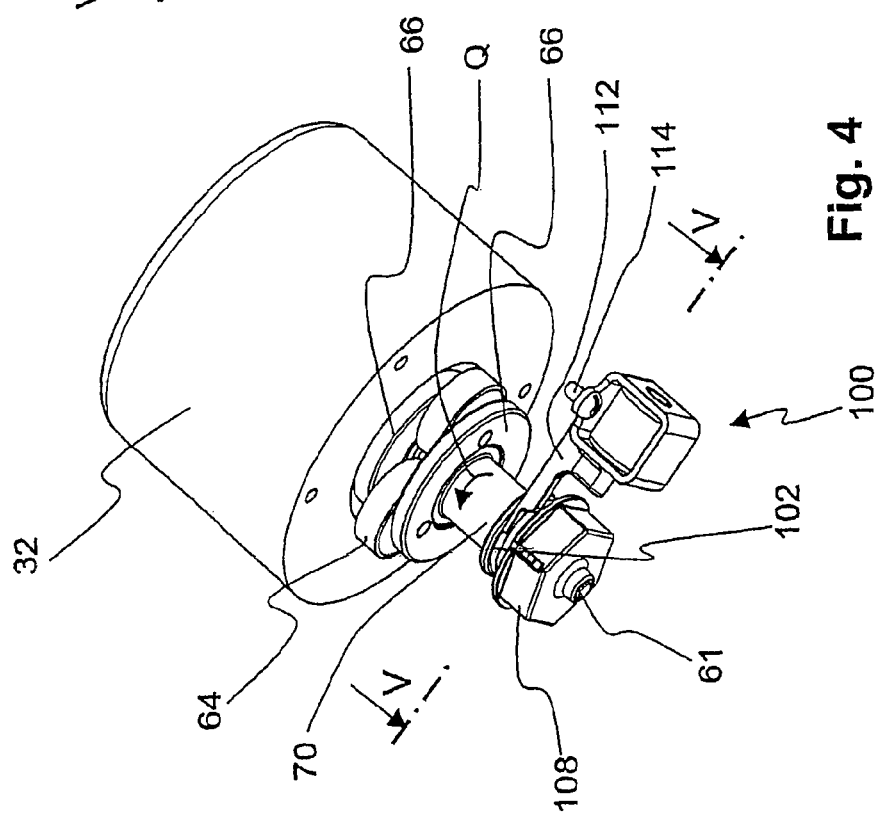
FIG. 4 is a perspective detail view of a combination of drive device and blocking device of the vehicle brake.

FIGS. 2, 3 and 4 provide information about the design of the drive of the spindle 38. The motor 32 is provided with an output shaft 61, on which a gearwheel 62 is disposed in a rotationally fixed manner. The gearwheel 62 acts as a sun wheel, with which planet wheels 64 mesh. The planet wheels 64 are mounted rotatably on a planet carrier 66. They mesh, as is customary in a planetary gear, with a ring gear 68 formed in the housing 12. The planet carrier 66 also has a smaller-diameter externally geared shaft portion 70, which, as the motor 32 rotates, rotates at a specific rotational speed in accordance with the transmission ratio of the planetary gear. It should be mentioned that the shaft portion 70, while being disposed and mounted on the motor output shaft 61, is however rotatable relative thereto.

There is further mounted in the housing 12 a journal 72, on which a transmission gearwheel 74 is rotatably disposed. This, as already indicated above, drives the locating bush 52 provided with the external gearing 54. In FIG. 2 it is evident that the locating bush 52 along its inner periphery has recesses 80 that extend in peripheral direction over a specific distance a and/or a corresponding angle α. On the cover 56 corresponding radial projections 82 are provided, which extend into the recesses 80. The radial projections 82 have a smaller extent b (and/or angular extent β) in peripheral direction than the dimension a (α) of the recesses 80, with the result that the cover disc 56 is rotatable relative to the locating bush 52 about the axis A. More precisely, a relative rotational movement about the axis A between the components 52 and 56 is possible over the distance d=a−b and/or over the angle δ=α−β.

This emerges in detail also from the detail representation according to FIGS. 7 to 9. There, it may also be seen that the radially inner end 84 of the spiral spring 56 is accommodated in a rotationally fixed manner in the transmission element 51. The radially outer end 88 of the spiral spring 50 is however accommodated in a rotationally fixed manner in a corresponding radial bore 90 that is formed in the locating bush 52. The spiral spring 56 is preloaded. Since—as already described above—the locating bush 52 is rotatable by the distance d relative to the transmission element 51, which in turn is coupled by the gearing 53 in a rotationally fixed manner to the spindle 38, as a result of a rotation of the locating bush 52 in clockwise direction in accordance with arrow P (FIG. 9) the rotational movement is transmitted by the spiral spring 50 to the transmission element 51, with a simultaneous increase of the preloading of the spring, and then from the transmission element 51 to the spindle 38. In other words, with increasing rotational resistance at the spindle 38 after attainment of a specific brake application force the spiral spring 50 is increasingly loaded. The relative movement between the locating bush 52 and the transmission element 51, which is connected in a rotationally fixed manner to the spindle 38 and is likewise connected in a rotationally fixed manner to the cover 56, is limited by the radial projections 82 and the recess 80 to the distance d and/or the angle δ.

As soon as the radial projections 82, starting from the position shown in FIG. 9, after completing the distance d come into abutment with the opposite radial flank of the recesses 80, there is no longer any further relative movement and the rotational movement is transmitted directly from the locating bush 52 to the transmission element 51 and from there to the spindle 38. The spiral spring 50 is then preloaded to the maximum extent.

By virtue of the relative movement by the distance d, it is possible by means of the spiral spring 50 to achieve at the spindle 38 a tension state with a "clamping force reserve" that is used to compensate settling operations at the brake linings 16 and 20 as a result of cooling or the like after infeed of the brake 10 during the parking braking operation. This will additionally be described in detail with reference to FIG. 10.

Figure 5:
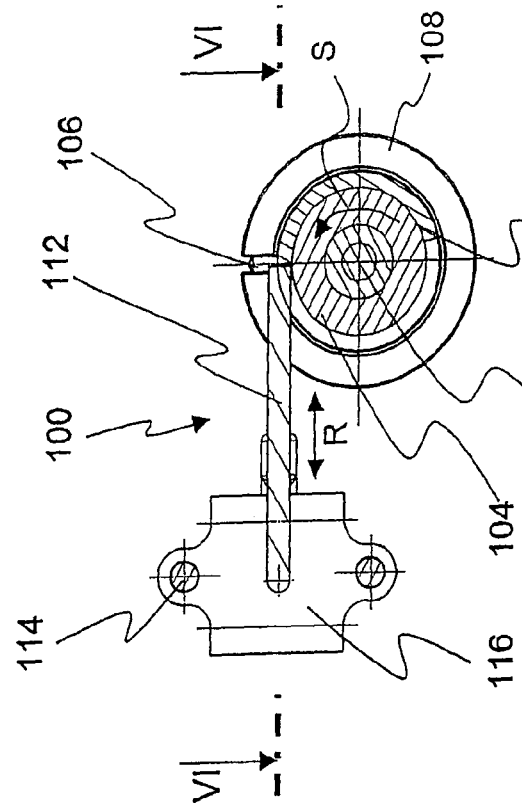
FIG. 5 is a sectional view along the section line V-V of FIG. 4 for explaining the blocking mechanism.
Figure 6:
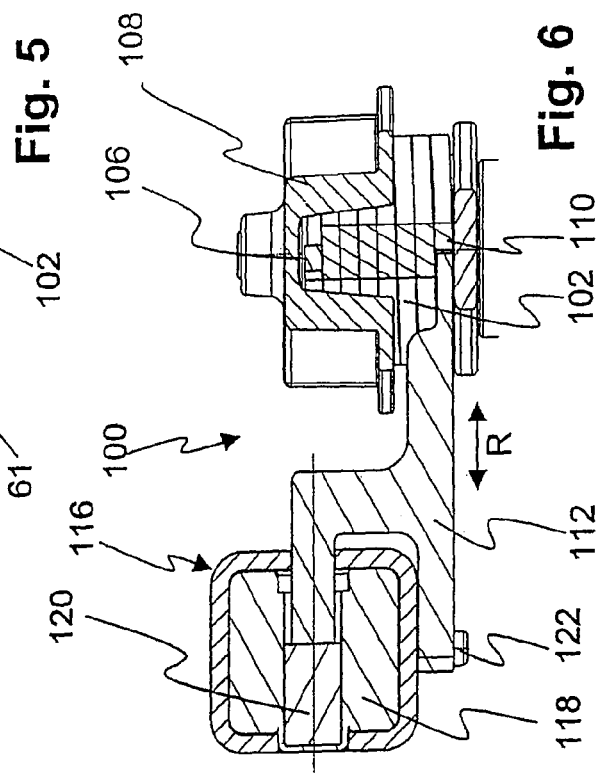
FIG. 6 is a sectional view along the section line VI-VI of FIG. 5 for further explaining the blocking mechanism.

Returning to the overview representation according to FIG. 3 and to the single-part representations according to FIGS. 4 to 6, it may be seen that on the motor output shaft 61 a blocking device 100 is also provided. The blocking device 100 is used to block the electromechanical drive arrangement 30 in the situation of a parking braking operation, in which after attainment of a specific clamping force at the brake disk 22 the brake linings 16 and 20 have to be arrested.

The blocking device 100 is shown in detail also in FIGS. 4 to 6. It comprises a loop spring 102, which is wound with slight play around a sleeve-like projection 104 of the shaft portion 70 of the planet carrier 66. At its one end 106 the loop spring 102 is accommodated in a rotationally fixed manner in a cap 108. From this end 106 a plurality of mutually adjacent turns, which are wound onto the portion 104, extend to the second end 110. This second end 110 of the loop spring 102 lies opposite a push end of a lever 112 of the blocking device 100. The lever 112 is displaceable along the arrow R. For this purpose a solenoid arrangement 116, which is fastenable by fastening elements 114 to the housing 12, is used. This comprises a magnet coil 118, which where necessary may be energized, and a permanent magnet 120, which in the non-energized state of the coil 118 occupies the position shown in FIGS. 5 and 6 and which upon energizing of the coil 118 ensures that the lever 112 is displaced in FIGS. 5 and 6 to the right. The lever 112 is additionally guided by a guide pin 122 linearly in direction R in the housing 12 of the solenoid 116.

The blocking device 100 acts like a freewheel, which allows a rotation in one direction of rotation but blocks it in the other direction of rotation and which may be operated by electromagnetic control where necessary in such a way that it allows rotations in both directions of rotation. If the motor 32 is set in rotation in such a way that the gearwheel 70 rotates in anticlockwise direction in accordance with arrow Q (see FIGS. 4 and 5), the loop spring 102 remains ineffective. In other words, the bush-shaped part 104 slips through relative to the loop spring 102 without the loop spring 102 exhibiting a blocking effect. Such a rotary drive is effected for example to apply the brake for a service braking operation or for a parking braking operation.

If however the gearwheel 70 moves in the opposite direction, this being shown by means of the arrow S in FIG. 5, the free end of the loop spring 110 is carried along. As a result, the loop spring 102 constricts and after only slight rotational travel of the part 104 blocks any further rotation by this part 104 because of the friction and wrapping that occur. As a result the gearwheel 70 is blocked. This blocking effect may be utilized to block the brake for a parking braking operation after additional loading to a specific clamping force.

In order to be able to release the brake, the coil 118 is energized so that the lever 112 is displaced in FIGS. 5 and 6 in each case to the right in accordance with arrow R. The free end 110 of the loop spring 102 is therefore displaced relative to the bush-like part 104 in such a way that a play arises once more between the loop spring 102 and the bush-shaped part 104. The tight wrapping of the part 104 and the static friction occasioned thereby is cancelled, so that the gearwheel 70 may be released for a rotational movement.

In other words, the blocking device 100 through the use of a loop spring 102 allows the blocking of a rotation of the gearwheel 70 in the one direction and the release in the other direction. It remains to comment that in a service braking situation of course the release of the brake is not hindered by the blocking device 100. In such a service braking situation the lever 112 as a result of energizing of the coil 118 is so positioned that a blocking effect of the loop spring 102 is permanently precluded.

There now follows a detailed description of the construction of the ball screw 36 with reference to FIGS. 11 to 15. It is evident from these figures that the spindle 38 is provided in its left region with a central bore 47 and in its right region with a central bore 130. The central bore 130 is used to receive the fastening screw 58, as already described above. Accommodated in the central bore 47 is the tension spring 46, the right end 132 of which is accommodated in a substantially rotationally fixed manner in a radial bore 134 to prevent unwanted axial displacement. The tension spring 46 has an elongate fastening bow 136, which on its end portion comprises a fastening hook 138. By means of the fastening hook 138 the spring element 46 is accommodated in one of a plurality of locating openings 140 that are formed around a central opening in the initially already mentioned thrust piece 48. Extending from this central opening of the thrust piece 48 into the bore 47 is a cup-shaped guide portion 142, by means of which the thrust piece is guided in an axially displaceable manner in the opening 47. The cup-shaped guide portion 142 on its end situated axially in the bore 47 also has positioning lugs 144 for positioning the spring portion 136.

Figure 11:
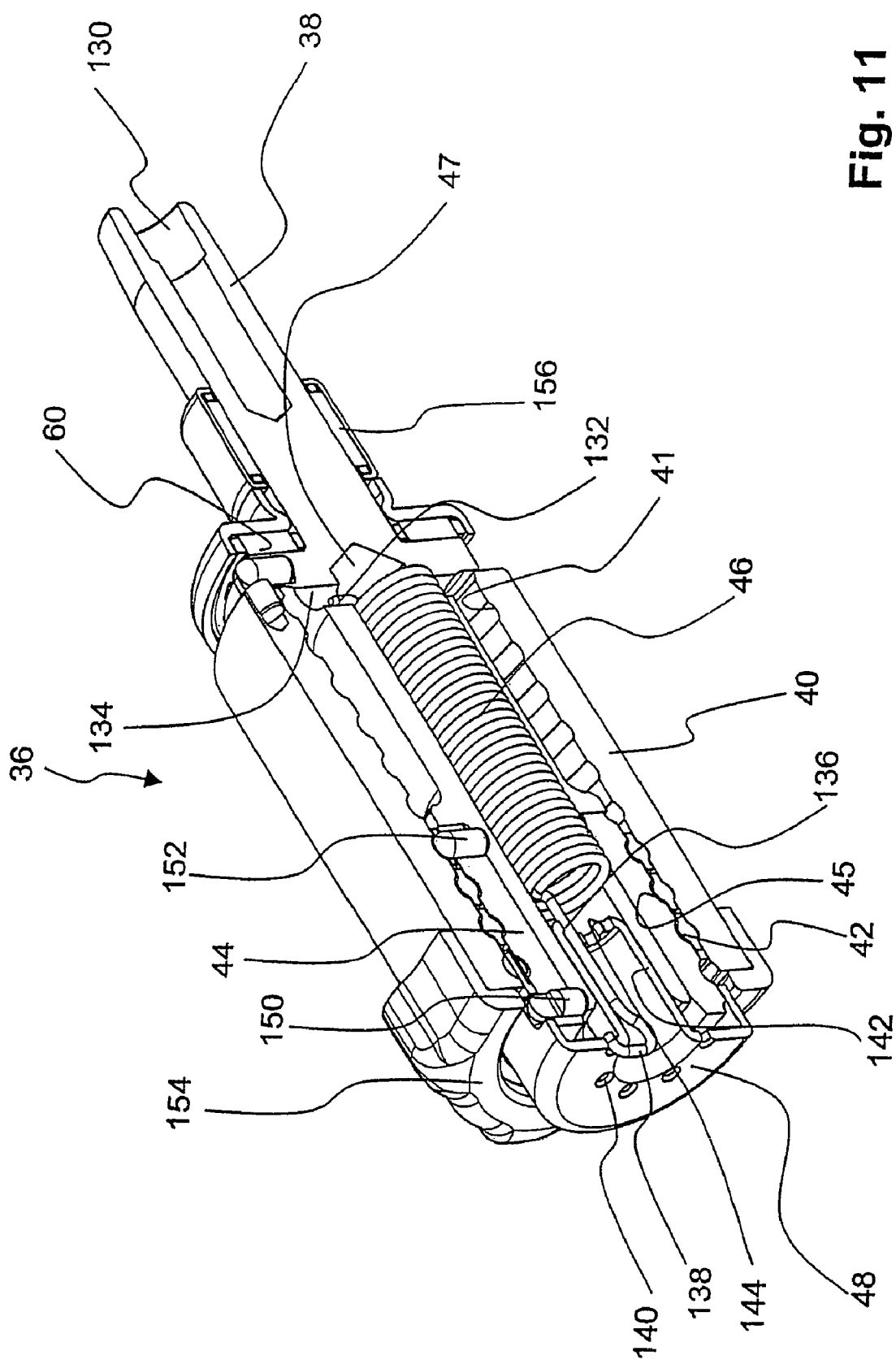
FIG. 11 is a perspective longitudinal sectional view of a ball screw according to the invention.
Figure 12:
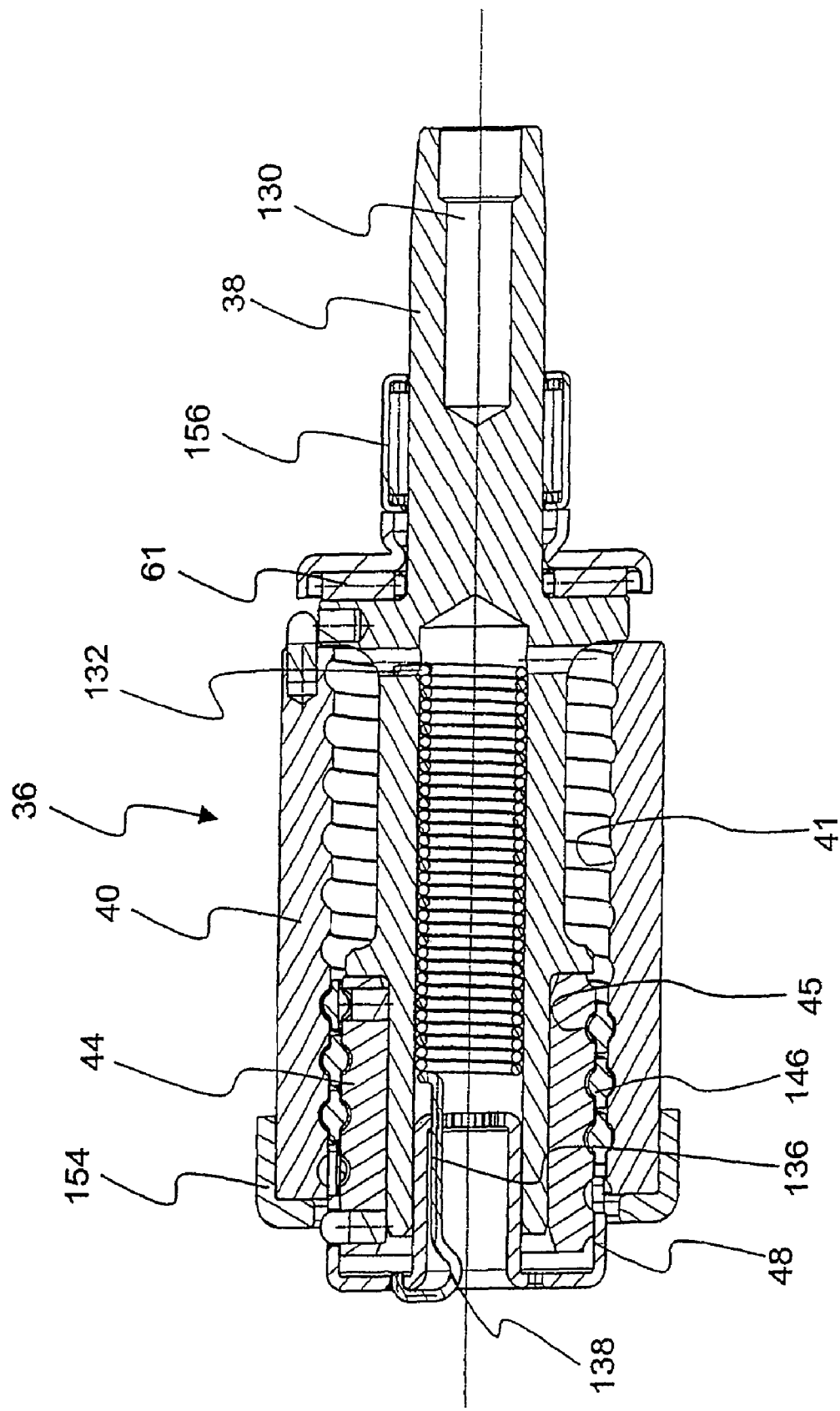
FIG. 12 is a longitudinal sectional view of the ball screw in detail.
Figure 13:
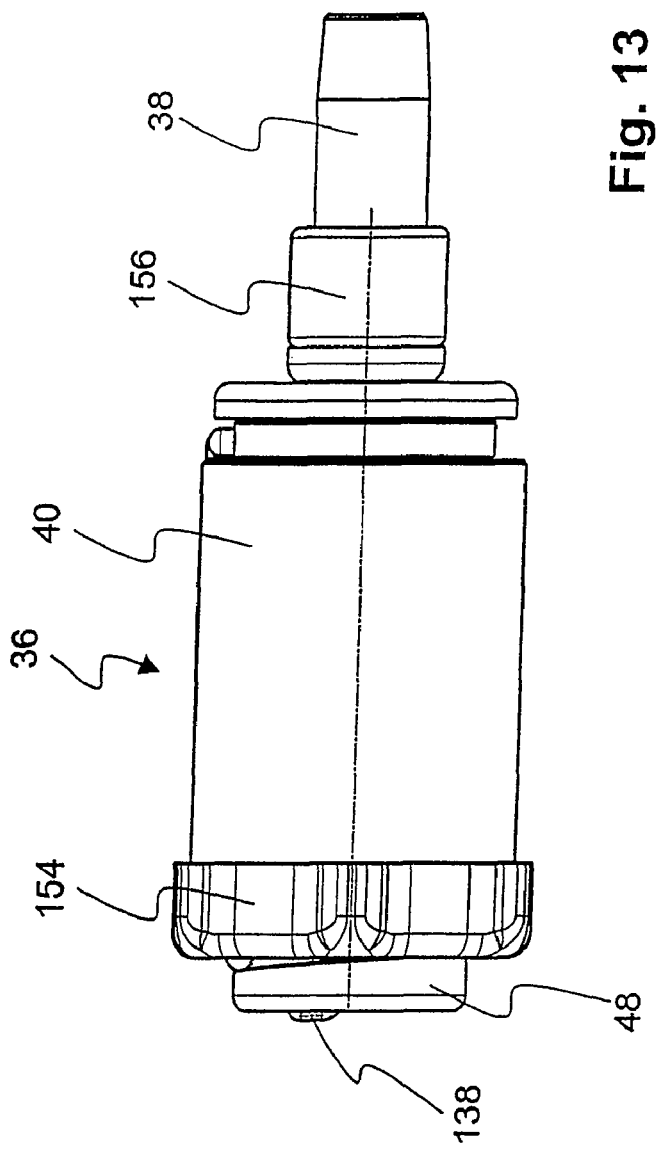
FIG. 13 is a side view of the ball screw according to the invention.
Figure 14:
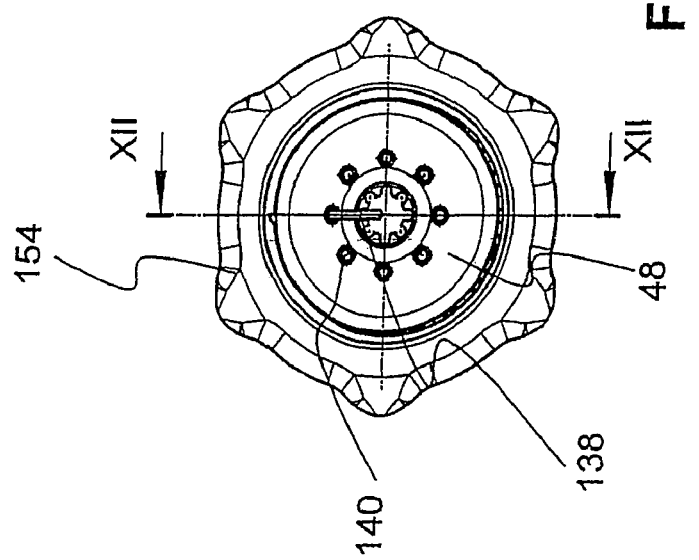
FIG. 14 is a front view of the ball screw according to the invention.
Figure 15:
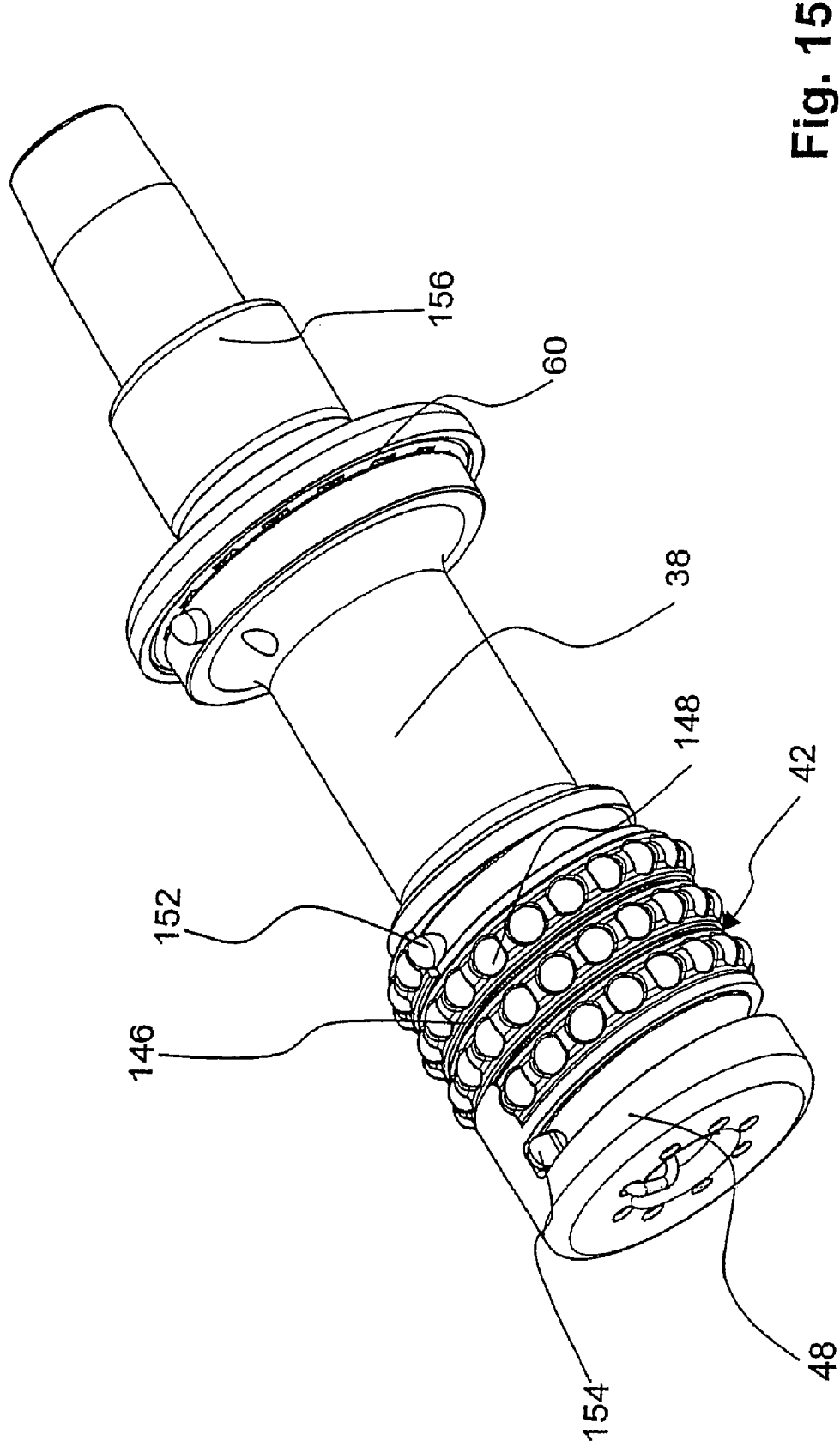
FIG. 15 is a perspective view of the ball screw according to the invention, the nut having been cut away.

It is further evident from FIG. 11, in particular however from the perspective representation according to FIG. 15, that the rolling body arrangement 42 is formed by a helically extending rolling body chain, which comprises a helical cage 146, in which spherical rolling bodies 148 are accommodated. As already stated, the rolling body arrangement 42 is guided in corresponding track grooves in the nut 40 and in the threaded bush 44. The threaded bush 44 comprises two stop pins 150 and 152, which delimit the relative movement between the rolling body arrangement 42 and the threaded bush 44 that is connected in a fixed manner to the spindle 38. The thrust piece 48 is preloaded by the spring element 46 into the normal position, which is shown in FIGS. 11 and 12 and in which the rolling body arrangement 42 abuts the stop pin 152. By means of this preloading it is guaranteed that the rolling body arrangement 42, when it is load-free, constantly returns to its normal position shown in the figures. In other words, this means that for example upon release of a parking braking state, when the clamping force is reduced, the spring element 46 finally returns the rolling body arrangement 42 automatically to the illustrated normal position.

Finally, in FIGS. 11 and 12 a star-shaped attachment 154 is additionally shown, which is mounted in a rotationally fixed manner on the nut 40 and guided in a linearly movable manner in the housing 12. By means of this attachment guided in a linearly movable manner in the housing the nut 40 acts upon the piston termination 26 in order to displace the brake lining 20. A radial bearing 156, by means of which the spindle is mounted in the housing 12, is moreover additionally shown.

The ball screw 36 according to the invention has the advantage that—unlike conventional ball screws—it does not require a complicated rolling body return mechanism that takes up space. It may therefore be dimensioned relatively small in axial direction and in radial direction. Because of the respective return of the rolling body arrangement 42 to its normal position by means of the spring element 46, after each actuation and subsequent return there is always the same maximum brake application stroke available. Wear compensation is effected exclusively by follow-up displacement of the nut 40. It should additionally be mentioned that such a wear follow-up may always be effected between two braking operations. This too guarantees that for the actual clamping function the ball screw 36 according to the invention has to effect only a relatively slight travel of for example 2 mm.

The vehicle brake according to the invention operates in the following manner:

During a service braking operation, as already described above, the motor 32 is energized so that the gearwheel 70 rotates in FIG. 4 in anticlockwise direction (FIG. 5 in clockwise direction). The gearwheel 74 is then driven accordingly and finally drives the locating bush 52. The rotational movement is transmitted via the spiral spring 50 to the spindle 38, wherein the spiral spring 50 is already preloaded to such an extent that, given the comparatively low clamping forces that usually arise during a service braking operation, no relative rotation occurs between the locating bush 52 and the transmission element 51. In other words, the spiral spring 50 during the brake application in a service braking situation acts like an unyielding rigid element, with the result that decelerations caused by the spiral spring 50 do not occur during the brake application in a service braking operation.

Figure 16:
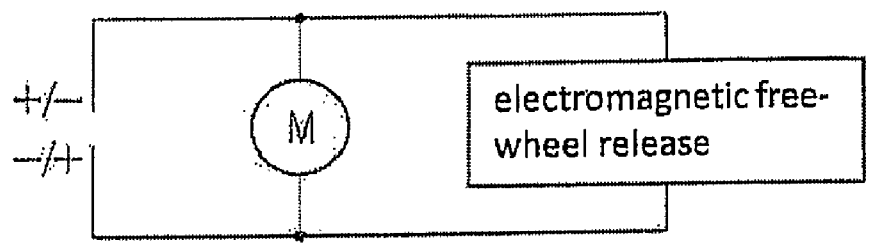
FIGS. 16 to 18 are representations explaining the control of the blocking device.

The application of the brake linings 16 and 20 is effected in dependence upon actuation of a brake pedal and/or in accordance with drive assist systems, such as an antilocking brake system, an adaptive cruise control system, a control system for regenerative braking etc. To release the brake during a service braking operation, the gearwheel 70 is correspondingly rotated in another direction. As already described above with regard to the blocking device 100, the blocking device 100 may be kept inactive during the service braking operation in that the lever 112 acts upon the free end of the loop spring 102 and displaces this free end relative to the gearwheel 70. However, other possible ways of controlling the blocking device 110 are described with reference to FIGS. 16 to 18.

What is desired during a parking braking operation, on the other hand, is to achieve a specific clamping force level during application of the brake and also permanently substantially maintain this level despite cooling-related settling processes at the brake linings 16 and 20. For this purpose, the brake 10 is actuated in the same way as described above with reference to the service braking operation, but with higher clamping forces. Initially a clamping force level of for example 22 kN is achieved by means of the motor drive. This may be seen for example in the graph according to FIG. 10. The spiral spring 50 is preloaded in such a way that a relative rotation between spindle 38 and locating bush 52 occurs only from approximately 16.5 kN.

As the clamping force increases further, the spiral spring 50 is additionally loaded more strongly beyond the degree of its preloading until finally the play d has been fully travelled. There is then once more a rise with a steeper gradient. This accounts for the kinks K1 and K2 in the continuous line according to FIG. 10. In other words, the portion of the curve between both kinks K1 and K2 precisely represents the additional loading of the spiral spring 50 during travel of the play d. After the point K2 has been reached, the brake is applied with a once more steeper characteristic up to a clamping force of approximately 21.5 kN, this corresponding to a brake application stroke of altogether approximately 1.5 mm.

As is generally known, after cooling of the brake linings in the parking braking state a settling process usually occurs, i.e. the brake linings slightly contract. Consequently, the brake application force applied to the brake disk drops. It is however necessary to guarantee that despite this settling process a sufficiently high clamping force of approximately 16.5 kN to guarantee a reliable parking braking state is still maintained. This settling process may be compensated within specific limits by means of the spiral spring 50. In other words, the spindle 38, driven by the clamping force of the spiral spring 50, in the event of a thermally occasioned contraction of the brake linings 16 and 20 is "post-pressed" and/or "post-rotated", wherein the clamping force may continue to be maintained above the desired level of 16.5 kN.

It should additionally be mentioned that, as already stated above, there is initially no blocking of the mechanical drive arrangement 30 while the parking braking state is being brought about. It is only when the clamping force of approximately 21.5 kN has been reached and the motor 32 has been switched off that the blocking device 110 becomes active and prevents a rotation of the gearwheel 70 in the direction of the release position. The blocking device 110 acts in such a way that the restoring moment resulting from the applied brake may be supported against the blocking device in the style of a blocking freewheel.

To release the parking brake the coil 118 is then energized and the lever 112 is pushed onto the end 106 of the loop spring, so that the wrapping effect of the loop spring 102 is cancelled and the loop spring 102 releases the gearwheel 70 for rotation into the unclamped position of the brake.

As already indicated above, the blocking device 110 may be operated in various ways. The loop spring 102 may be switched in various ways to a state that releases the part 104. For example it is possible, each time the motor is energized, to energize the coil 118 in order to displace the lever 112. This is achieved by means of a circuit of the type represented in FIG. 16.

Figure 17:
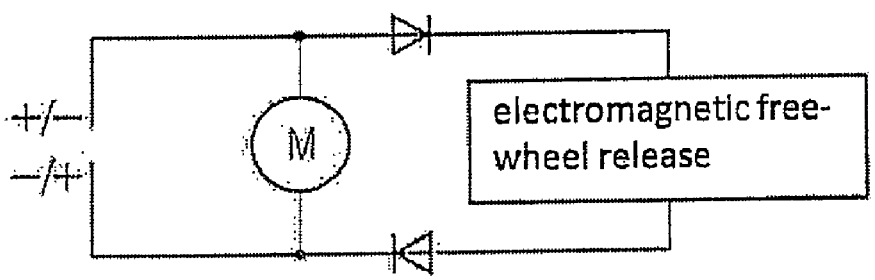

As an alternative to this, it is possible to carry out only a directional current energization of the coil 118 and hence an energization in dependence upon the direction of rotation of the motor. In other words, the blocking device 110 becomes current only when the motor 32 rotates in brake application direction. This is achieved by the use of two diodes, as shown in FIG. 17.

Figure 18:
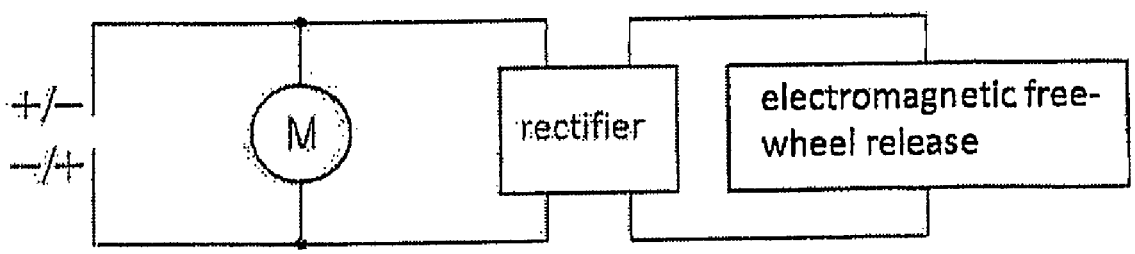

As an alternative to this it is further possible, as shown in FIG. 18, to use a circuit for a solenoid with a permanent magnet armature, wherein a rectifier is inserted between the motor circuit and the circuit used to control the blocking device 100.

Figure 19:
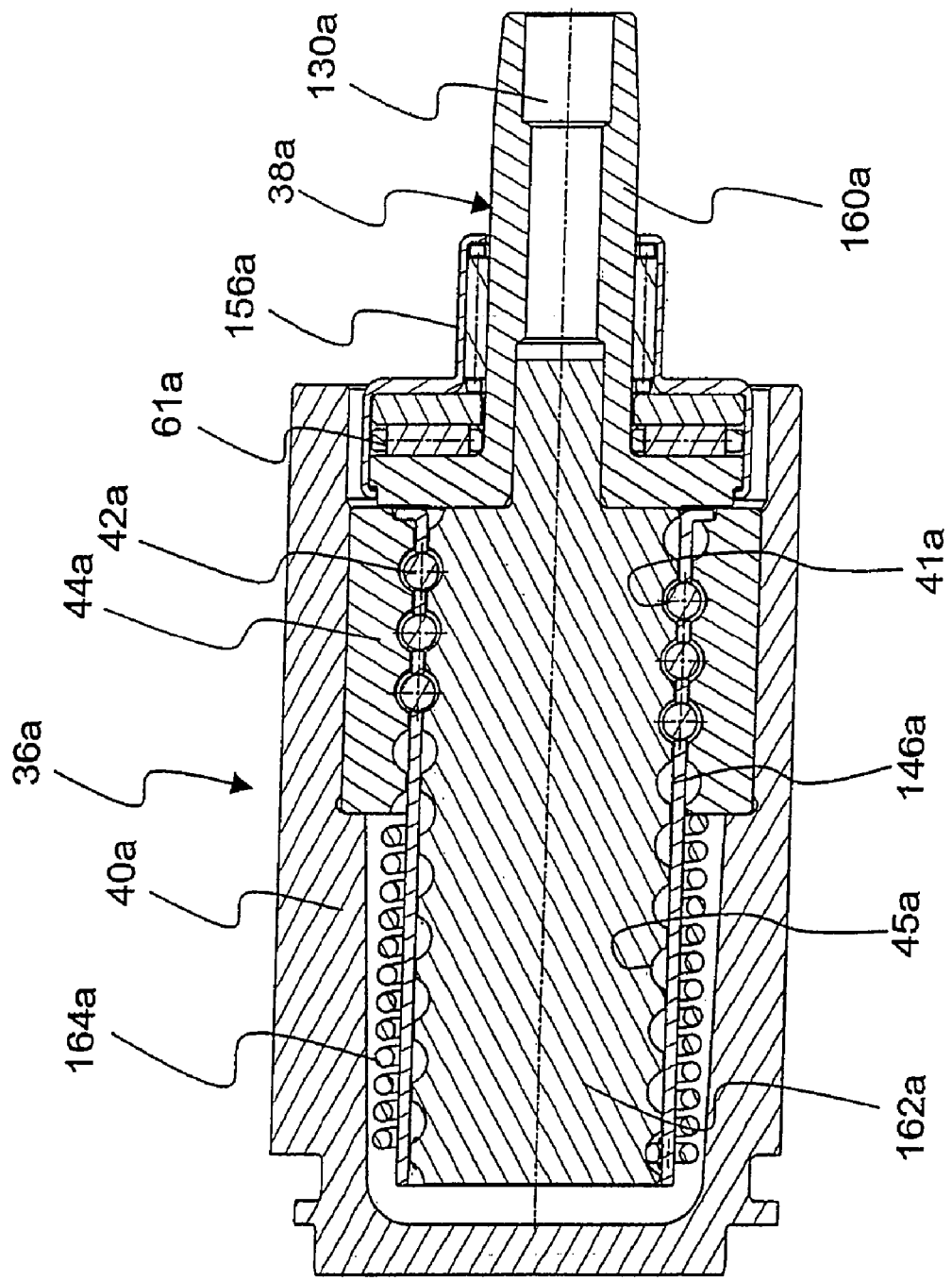
FIG. 19 is a longitudinal sectional view of a second embodiment of the ball screw.
Figure 20:
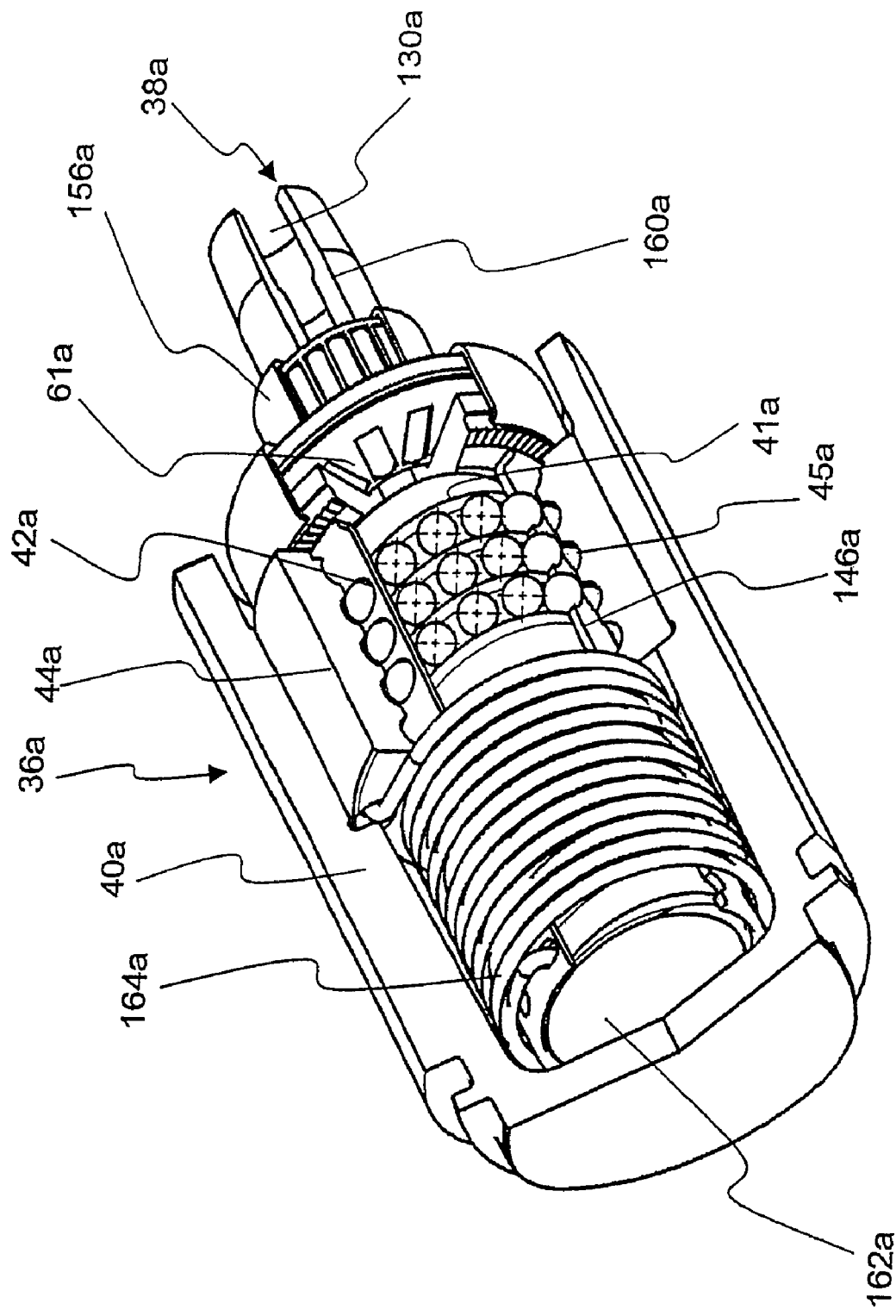
FIG. 20 is a perspective view of the ball screw according to FIG. 19.

FIGS. 19 and 20 show a further embodiment of the ball screw according to the invention. In the description of this further embodiment the same reference characters are used for components of an identical type or an identical effect as in the description of FIGS. 11 to 15, only with the lower-case letter "a" as a suffix.

In FIG. 19 it may be seen that the spindle 38a is constructed in two parts, namely an extension 160a and a spindle body 162a. The extension 160a and the spindle body 162a are screw-connected in a fixed manner to one another. The spindle body 162a is solid and, in contrast to the first embodiment according to FIGS. 11 to 15, has no central opening. On its outer peripheral surface the spindle body 162a is constructed with a track groove formation 45a. In this track groove formation the rolling bodies of the rolling body arrangement 42a run. The rolling bodies of the rolling body arrangement 42a are accommodated in a bush-like cage 146a. Furthermore, the rolling bodies of the rolling body arrangement 42a run in a threaded bush 44a, which is connected in a fixed manner to the piston-like nut 40a, in particular is press-fitted therein.

On the spindle body 162a, i.e. outside of the portion of the bush-like cage 146a that projects from the threaded bush 44a, a compression torsion spring 164a is mounted. This, as may be seen in FIG. 20, is anchored by its one angled end in a fixed manner in the bush 44a and by its other angled end in a fixed manner on the bush-like cage 146a of the rolling body arrangement 42a. The compression torsion spring 164a ensures that the rolling body arrangement 42a is preloaded into the normal position shown in FIG. 19.

The ball screw 36a according to the embodiment according to FIGS. 19 and 20 has substantially the same mode of operation and hence also the same advantages as described above with reference to FIGS. 11 to 15. It differs merely in that the spring 164a acts between the threaded bush 44a and the rolling body arrangement and accordingly preloads the rolling body arrangement 42a into the normal position thereof.

With the arrangement according to FIGS. 19 and 20 it is possible on the whole to achieve a more compact design, in particular with this arrangement a brake piston of a more compact design may be achieved.

In accordance with the provisions of the patent statutes, the principle and mode of operation of this invention have been explained and illustrated in its preferred embodiments. However it must be understood that this invention may be practiced otherwise than as specifically explained and illustrated without departing from its spirit or scope.

What is claimed is:

1. Ball screw for a motor vehicle brake comprising
   a rotatable spindle,
   a nut that is axially movable relative to the spindle in accordance with the rotation thereof and
   a rolling body arrangement that is disposed between, and displaceable relative to, the spindle and the nut,
   wherein the rolling body arrangement is preloaded into a predetermined normal position by means of at least one spring element disposed outside of the rolling body arrangement, the at least one spring element disposed outside of the spindle and wherein the nut is connected in a fixed manner to a threaded bush having track grooves for the rolling body arrangement.

2. Motor vehicle brake comprising a brake lining that is displaceable relative to a housing, a motor drive, and a displacement mechanism disposed between the brake lining and the motor drive, wherein the displacement mechanism comprises a ball screw according to claim 1.

3. Motor vehicle brake according to claim 2, wherein the spindle of the ball screw is rotatable by means of the motor drive.

4. Motor vehicle brake according to claim 2, wherein the motor drive comprises a gear arrangement.

5. Ball screw according to claim 1, wherein the rolling body arrangement comprises a bush-like rolling body cage.

6. Ball screw according to claim 5, wherein the bush-like rolling body cage extends between the spindle and the spring element.

7. Ball screw according to claim 1, wherein the at least one spring element takes the form of a preloaded tension spring, a compression spring or a torsion spring.

8. Ball screw for a motor vehicle brake comprising
   a rotatable spindle,
   a nut that is axially movable relative to the spindle in accordance with the rotation thereof and
   a rolling body arrangement that is disposed between, and displaceable relative to, the spindle and the nut,
   wherein the rolling body arrangement is preloaded into a predetermined normal position by means of at least one spring element disposed outside of the rolling body arrangement, the at least one spring element disposed outside of the spindle;

wherein the rolling body arrangement comprises a bush-like rolling body cage;

wherein the bush-like rolling body cage extends between the spindle and the spring element.

9. Motor vehicle brake comprising a brake lining that is displaceable relative to a housing, a motor drive, and a displacement mechanism disposed between the brake lining and the motor drive, wherein the displacement mechanism comprises a ball screw according to claim 8.

10. Motor vehicle brake according to claim 9, wherein the spindle of the ball screw is rotatable by means of the motor drive.

11. Motor vehicle brake according to claim 9, wherein the motor drive comprises a gear arrangement.

12. Ball screw according to claim 8, wherein the nut is connected in a fixed manner to a threaded bush having track grooves for the rolling body arrangement.

13. Ball screw according to claim 8, wherein the at least one spring element takes the form of a preloaded tension spring, a compression spring or a torsion spring.

* * * * *